US010373363B2

(12) United States Patent
Almosnino et al.

(10) Patent No.: US 10,373,363 B2
(45) Date of Patent: Aug. 6, 2019

(54) SYSTEMS AND METHODS FOR VISUALLY CREATING AND EDITING SCROLLING ACTIONS

(71) Applicant: Adobe Inc., San Jose, CA (US)

(72) Inventors: Noam Almosnino, Seattle, WA (US); Paul H. Sorrick, Seattle, WA (US); Lance Bushore, Seattle, WA (US); Razvan Cotlarciuc, Seattle, WA (US); Dana Cooper, Seattle, WA (US); David E. Williamson, Woodinville, WA (US)

(73) Assignee: Adobe Inc., San Jose, CA (US)

( * ) Notice: Subject to any disclaimer, the term of this patent is extended or adjusted under 35 U.S.C. 154(b) by 21 days.

(21) Appl. No.: 13/949,749

(22) Filed: Jul. 24, 2013

(65) Prior Publication Data
US 2015/0029197 A1 Jan. 29, 2015

(51) Int. Cl.
G06T 13/80 (2011.01)
(52) U.S. Cl.
CPC .......... G06T 13/80 (2013.01); G06T 2200/24 (2013.01)
(58) Field of Classification Search
None
See application file for complete search history.

(56) References Cited

U.S. PATENT DOCUMENTS

| 6,278,455 | B1 * | 8/2001 | Baker | G06F 3/0481 345/473 |
| 2004/0260767 | A1 * | 12/2004 | Kedem et al. | 709/203 |
| 2008/0055315 | A1 * | 3/2008 | Ducharme | G06T 13/00 345/473 |
| 2010/0207950 | A1 * | 8/2010 | Zhao | G06T 13/00 345/473 |
| 2012/0056889 | A1 * | 3/2012 | Carter | G06T 13/00 345/473 |
| 2012/0209725 | A1 * | 8/2012 | Bellinger | G06Q 30/0225 705/14.73 |
| 2013/0305170 | A1 * | 11/2013 | de Souza et al. | 715/760 |
| 2014/0297516 | A1 * | 10/2014 | Brown et al. | 705/39 |

OTHER PUBLICATIONS

Creating Cool Scrolly Stuff with Scrollorama as appearing on Jan. 29, 2013, and available at http://web.archive.org/web/20130129192150/http://www.instantshift.com/2012/09/03/creating-cool-scrolly-stuff-with-scrollorama/.*

* cited by examiner

Primary Examiner — Stephen S Hong
Assistant Examiner — Richard M Russell
(74) Attorney, Agent, or Firm — Kilpatrick Townsend & Stockton LLP

(57) ABSTRACT

Systems and methods for visually creating scroll-triggered animation in a document. Based on input received, a key position is determined that is associated with an element that is to be animated. An indicator may be displayed to visually show the location of the key position on an editing canvas. A scroll-triggered animation is defined for the element based on the specified key position. The scroll-triggered animation defines attributes of the element during scroll of the document in the end use environment. For example, the animation may specify that the element has a particular location when the scroll is at the specified key position. The scroll-triggered animation may additionally or alternatively comprise a before-effect and an after-effect, performing one animation before the scroll reaches the key position and another animation after the scroll reaches the key position.

20 Claims, 8 Drawing Sheets

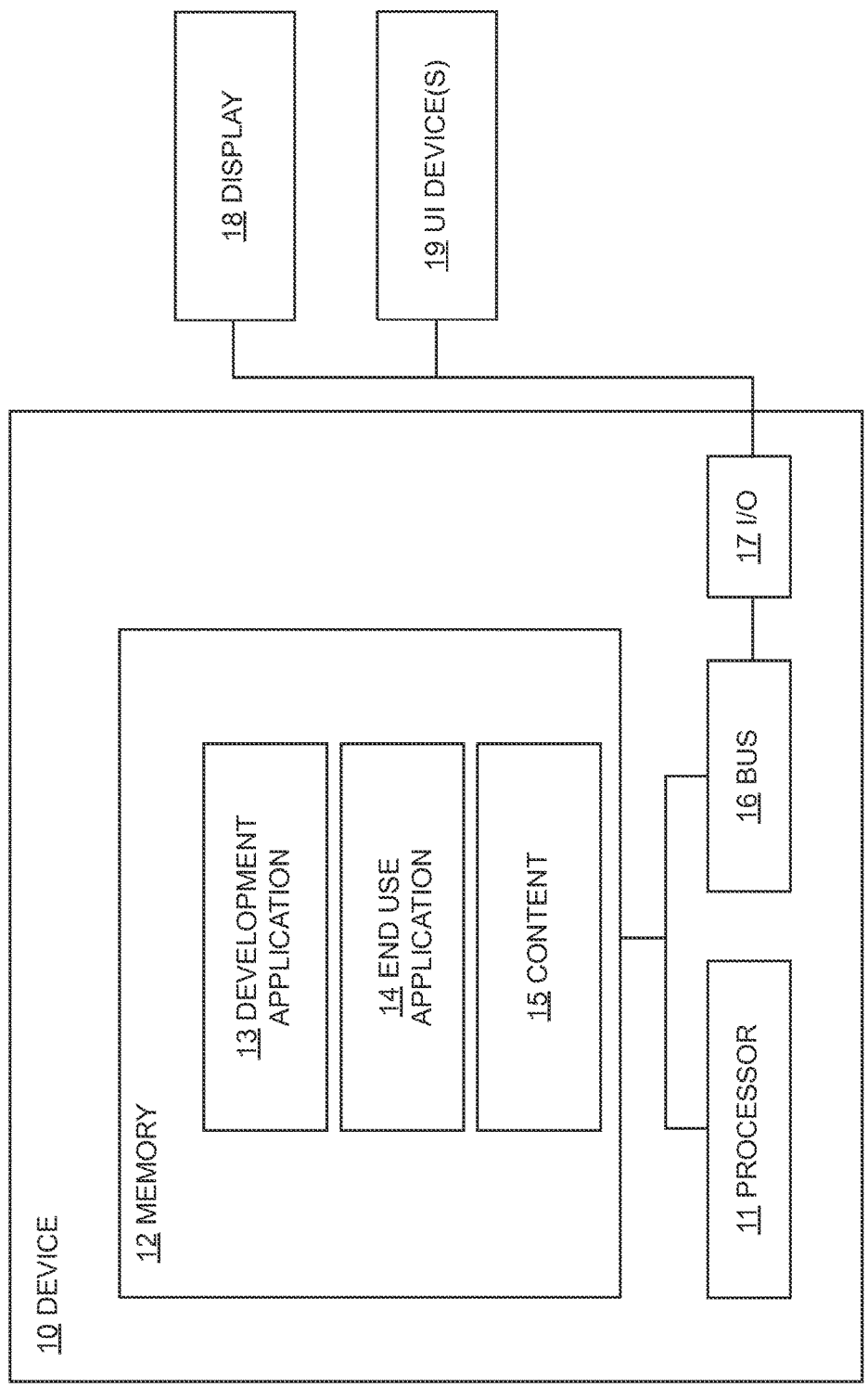

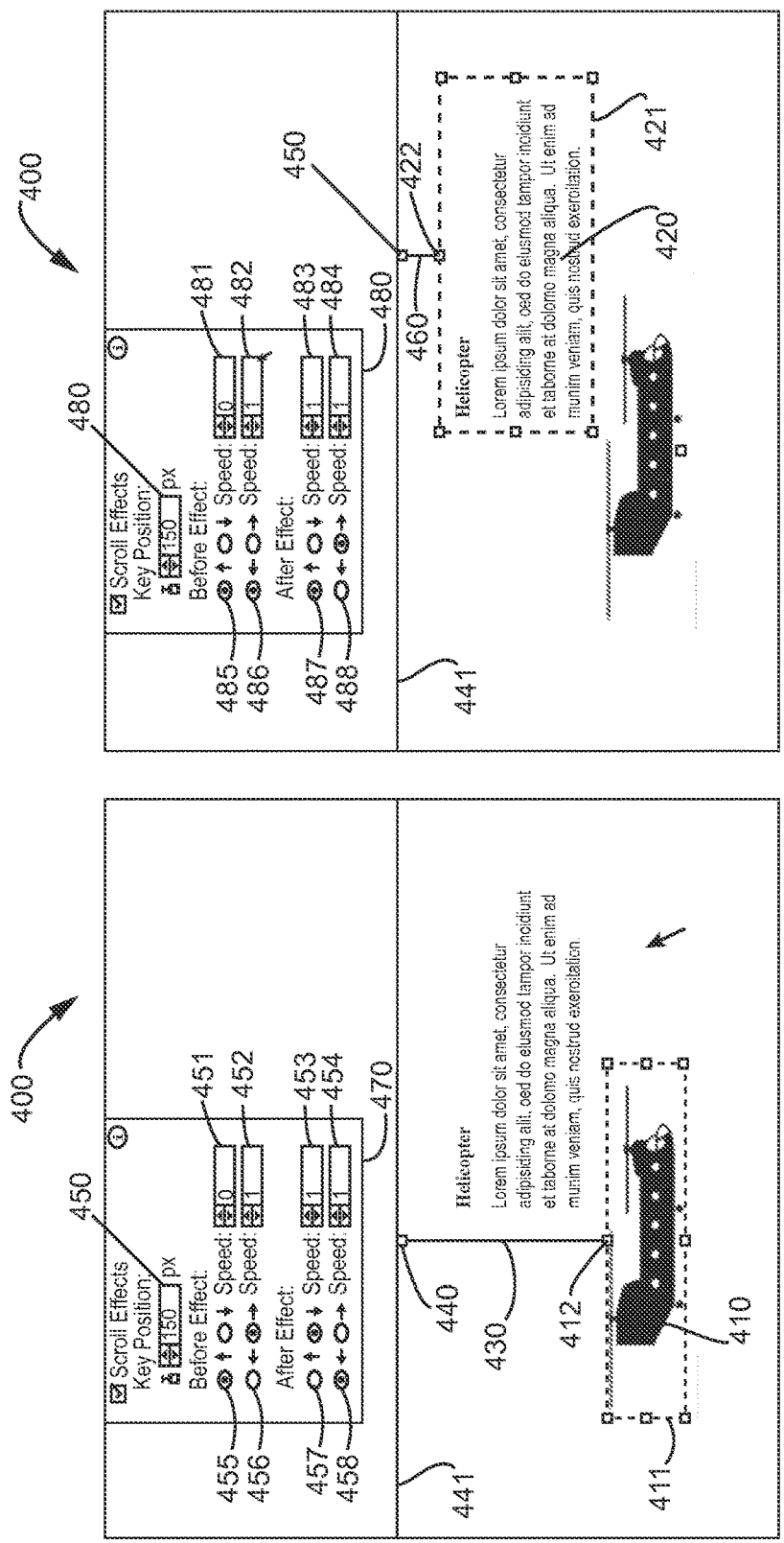

SYSTEMS AND METHODS FOR VISUALLY CREATING AND EDITING SCROLLING ACTIONS

FIELD

This disclosure relates generally to systems and methods that facilitate the creation and editing of animation, and specifically relates to the creation and editing of scroll-triggered animation.

BACKGROUND

Various types of animation exist. Some animation involves change that occurs over time. For example, an animated graphic of a person may move across a computer screen over the course of a fifteen second period. Animation may also involve changing a property over time. For example, the color of a graphic may be animated to change over time so that every second the graphic's color changes to a different color over the course of a minute. Animation can also involve change that occurs in response to user input and other triggering events. For example, scroll-triggered animation involves change that occurs based scroll position. The scroll position changes based on user input or otherwise, for example, by a user scrolling up and down or right and left to display un-displayed portion of a document or webpage. As such scroll position changes occur the animation occurs. As a specific example, the horizontal position of a graphic of a car within a document may be animated to move from left to right as the document scrolls down. As the document is scrolled down one scroll unit, the car moves to the right one scroll unit.

Existing techniques for creating scroll-triggered animation on web pages and other documents have various deficiencies. Creating scroll-triggered animation of elements generally requires a developer to write code without being able to easily observe and test the scroll-based animation that is being created. For example, to animate an element on a scrolling web page, a developer may mentally calculate or otherwise envision the various positions an item will be located as it moves on a page. These various positions are then coded using a scripting language such as dHTML, CSS or JAVASCRIPT. Only after the code is executed are the results of the animation displayed for the developer to allow the developer to see how the animation works. If the animation of the element is not as it was intended while coding, the developer must edit and re-run the code again. This loop of code, execute, and view must be repeated until the element moves as desired. If more than one item is animated, the time spent coding and testing is greatly increased as the actions of each item in relation to each other must be calculated, coded and tested.

SUMMARY

Exemplary methods and systems are disclosed to facilitate creating and/or editing scroll-triggered animation. An animation creation environment provides various features that display or facilitate creating and editing of attributes of a scroll-triggered animation. One exemplary embodiment of creating and/or editing scroll-triggered animation provides identifying an element on a canvas, the canvas displaying a document being edited in a development environment for use in an end use environment. The embodiment further involves, based on input received on the canvas, determining via a processor, a location of a key position associated with the element. The embodiment further involves defining a scroll-triggered animation for the element based on the key position, wherein the scroll-triggered animation defines an attribute of the element during a scroll of the document in the end use environment.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where:

FIG. 1 is a block diagram depicting an exemplary computing device for use in certain embodiments;

FIGS. 4A and 4B illustrate a user interface of a development environment in which two design elements and respective associated key positions are displayed;

DETAILED DESCRIPTION

Figure 2A:
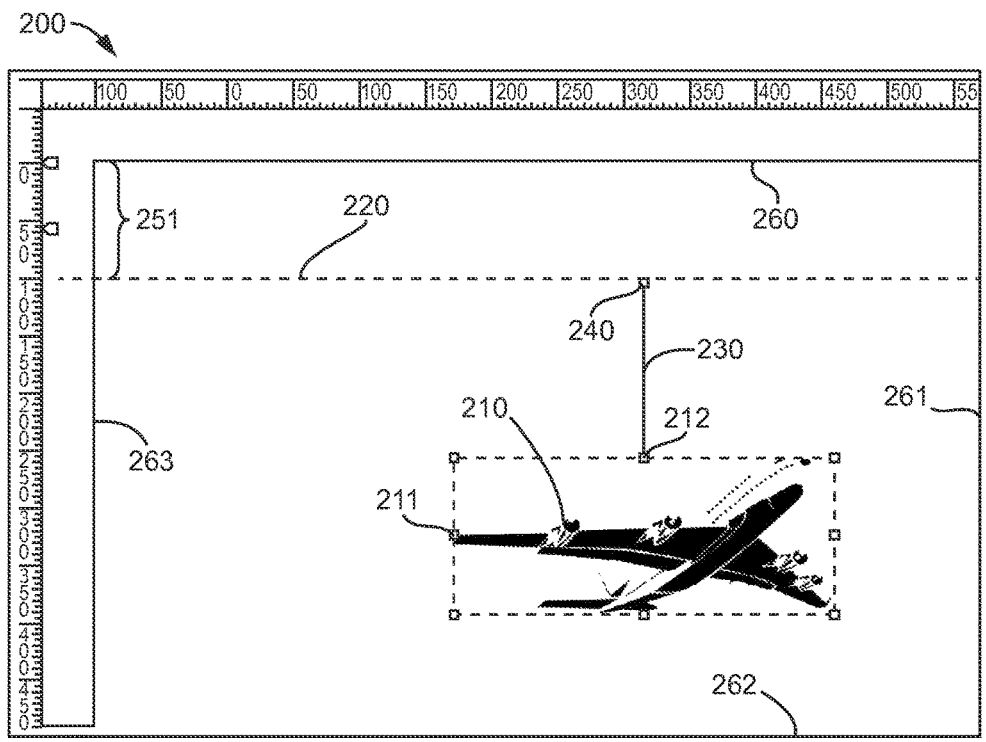
FIGS. 2A and 2B illustrate a user interface of a development environment in which a design element is identified and graphically indicated.

Systems and methods are disclosed that facilitate visually creating scroll-triggered animation. The methods and systems disclosed herein may be used in a variety of contexts and provide various advantages and features. To illustrate certain features and advantages the following discussion describes an embodiment in which a computer interface allows a user to visually create scroll-triggered animation of elements. However, it will be understood by those of skill in this art that the methods and techniques may be used in other circumstances and may be modified and adjusted as appropriate to address the particular requirements presented by those circumstances. Exemplary methods and systems facilitate the creations and/or editing of scroll-triggered animation. An animation creation environment provides various features or facilitate creating and editing of attributes of a scroll-triggered animation using a canvas in a development environment.

The term "canvas" is used herein to refer to an viewing/editing area displayed in a development environment in which graphical elements can be displayed for viewing and/or editing. Some or all of the appearance of a document being edited may be displayed in the canvas of a development environment. A canvas may be a What You See Is What You Get (WYSIWYG) canvas such that the appearance is the same as the appearance the content will have in the end use environment.

A canvas may be configured to display one or more features of a scroll-triggered animation that is being created or edited. In one embodiment, one or more indicators are displayed on a canvas to allow a user to visualize features of a scroll-triggered animation relative to a scroll position.

The term "scroll position" is used herein to refer to a position in an end use environment to which a document has been scrolled. Such a position can be identified relative to a reference point within the document. For example, a document that is 1000 pixels from top to bottom may first be presented at a zero scroll position in which the top of the document appears at the top of the displayed screen and the top 500 pixels of content are displayed on the screen's viewable region. Another scroll position occurs after the end user scrolls down 100 pixels such that the content 100 pixels from the top of the document appears at the top of the displayed screen and the pixels of content in the range from 100-600 pixels are displayed in the screen's viewable region. In the following examples, these scroll positions are referred to as scroll positions A and B, respectively.

One embodiment provides a way for a user developing animated content to visualize scroll-position-specific information associated with a scroll-triggered animation in the content. In the above example, the user developing the animations may see an indicator on the canvas that corresponds to a particular scroll position, i.e., corresponding to a key position, such as scroll position B. This visual indicator may be displayed as part of the document's content that is being edited on the canvas. The location of the visual indicator within the document's content may visually provide information to the user. For example, an indicator of scroll position B may be located 100 pixels from the top of the document's content on the canvas. The user can interpret the relative location of the indicator in the document's content, i.e., 100 pixels from the top, to understand that that indicator is associated with a the particular scroll position, i.e., the scroll position that occurs after the user scrolls down 100 pixels from the initial scroll position.

A visual indicator can be displayed to indicate a particular scroll position at which an element will have a particular attribute value. This is illustrated in FIG. 2A. In FIG. 2A, on a canvas displaying a document being edited in a development environment, an indicator at key position 240 indicates a particular scroll position. Specifically, in this example, the key position 240 indicates a scroll position when the web page in use is scrolled such that the key position 240 is at the top edge 260 of the displayable area. In other words, the key position 240 is associated with a scroll position that occurs during end use of the web page that is being developed. This scroll position occurs during end use when the user scrolls down 100 units from the top most scroll position. In the development environment, as shown in FIG. 2A, the indicator at key position 240 indicates the particular scroll position as the scroll position at which the object 210 will have a particular attribute. Specifically, the indicator at the key position 240 shows that when the web page is scrolled such that the key position 240 is at the top edge 260 of the displayable area, a location attribute of the object 210 will be such that the object appears at a particular location. In this example, the particular location is specified with respect to a reference point at the top edge 260 of the canvas and the location attribute of the object is specified such that the object will be located a distance (represented by distance indicator 230) from the top edge 260.

The indicator of the key position 240 and the distance indicator 230 of FIG. 2A are provided here to introduce features of one exemplary embodiment with respect to allowing a user to visualize a feature of a scroll-triggered animation that is being created or edited. Additional and alternative visual indicators and features are also contemplated.

In another exemplary embodiment, multiple key positions may be associated with an object. For example, a first key position may be defined for an object X at 140. This first scroll position occurs during end use when the user scrolls down 140 units from the top most scroll position. A second key position may be defined for the same object X at 160. This second scroll position occurs during end use when the user scrolls down 160 units from the top most scroll position. By defining these two key positions, first key position and second key position, associated with the same object X, a range of scroll positions is defined for object X. In this example, the range of scroll positions is between 140 units from the top most scroll to 160 units from the top most scroll. In the development environment, the first key position and second key position indicate the range of scroll positions at which object X will have particular attributes. Therefore, in end use, as the page scrolls down between 140 units to 160 units from the top most scroll, object X will display the attributes defined for object X in the development environment. Note that multiple key positions may be associated with an object; therefore, multiple ranges of scroll positions may be defined depending on the number of key position associated with an object.

The creation and editing of a scroll-triggered animation can be facilitated by allowing a user to position objects, animation indicators, and/or specify animation properties through dialog boxes, menus, and other interface features. The use of such a feature can reduce or eliminate the need to code one or more of these attributes of the scroll-initiated animation and may make the creation and modification of such scroll-triggered animations a quicker, easier, or otherwise better experience for a user.

One exemplary method of creating scroll-trigged animation comprises identifying an element on a canvas. The user then selects a command to associate a key position with the identified element. The key position may be identified on the canvas using an indicator to represent the location of the key position. The user may reposition the key position indicator to change the location of the key position. In one embodiment, the key position may be set anywhere on the canvas using an indicator that has a handle-shaped graphical appearance to distinguish it from other indicators that may be on the canvas. An animation that is created can be based at least in part on the specified key position. A scroll-triggered animation, for example, may specify that an attribute of the element will have a particular value when the scroll reaches the key position. As a specific example, a user may add a graphic of a car to an editing canvas at a position 100 pixels from the left edge of a web page being developed. The user may initiate a command to create a key position, and the development application may respond by creating a key position between that left edge and the car, i.e., 60 pixels from that left edge and 40 pixels from the car. Thus, merely by initiating this simple command, the user has created an animation attribute specifying that when, in end use, the left-right scroll reaches the key position, i.e., scrolled 60 pixels to the right, the car will be 40 pixels from the left edge. In the development environment, this animation attribute is represented by the display of an indicator representing the location of the key position relative to the reference, i.e., relative to the left edge, and representing the location of the key position relative to the associated object, i.e., relative to the car.

In the above example, the indicator shows two relationships: key position-to-reference and key position-to-object. Such an indicator can alternatively indicate only one of these relationships. For example, a color attribute may be similarly specified for a scroll-triggered animation. As a specific example, the user may create a circle and a key position 50 pixels from the top edge of the web page, and define (by default or manually) a value of red for the circle for the key position. Thus, the user has created an animation attribute specifying that when the end use top-bottom scroll reaches the key position, i.e., scrolled 50 pixels from the top, the circle will have a red color. The user may select a graphic indicator for the key position and see the object in red. If another key position is defined for the object at which the object will have the color blue, the user may select a different graphic indicator for that second key position and see the object in blue as it will appear when scrolled to that position in the end use environment. The user is thus able to visualize the attribute of the object (i.e., its color) at different scroll locations.

Attributes of the object at other scroll positions, e.g., the car's location, color, size, or anything else about the car that can be changed, can be specified by creating other key positions or multiple key positions, by creating animations referenced to key positions, or in any other suitable manner. For example, by creating two key positions associated with the car, a range of scroll positions may be defined. Animation attributes can then be defined for the car that are shown in the end use environment as the user scrolls in the range of the scroll positions defined. For example, a graphic of a car on an editing canvas is at position 200 pixels from the left edge of a web page being developed. The first key position is created 160 pixels from the left edge and 40 pixels from the car. A second key position is created 60 pixels from the left edge and 140 pixels from the car. The range of scroll positions is therefore defined to be between 60 pixels from the left edge of the web page being developed and 160 pixels from the left edge of the web page being developed. Hence, animation attributes may be defined for the car before the scroll reaches 60 pixels from the left edge of the browser, during the range of scroll positions (i.e., between 60 pixels from the left edge of the browser and 160 pixels from the left edge of the browser), and after the scroll reaches 160 pixels from the left edge of the browser. In this example, the scroll triggered animation may be defined as follows: the car may display the color red before the scroll reaches 60 pixels from the left edge of the browser, the sound of a horn may play as the scroll is in the range of scroll positions (i.e., between 60 pixels from the left edge of the browser and 160 pixels from the left edge of the browser), and the car may display the color blue after the scroll position reaches 160 pixels from the left edge of the browser.

A line or other indicator may be displayed to indicate the association of the key position with the element. As a specific example, a line may connect the element (or a selection box displayed around the element) with handle-shaped graphic that indicates the key position. Such an association indicator may indicate additional information about the animation that is being defined, for example, it may be a distance indicator such that the length of the indicator indicates the distance of the element from a reference (such as an edge) when the scroll reaches the key position (such as when the scroll moves to a position at which the key position would be at the edge).

Creating and editing animation can also be facilitated by allowing the user to define aspects of the animation relative to one or more key positions. A scroll-triggered animation may comprise before-effect animation, during-effect animation, and after-effect animation relative to specified key positions. In end use during a scroll, when the key position associated with the element is at the reference (such as an edge), the element has an attribute value specified for the key position location. As the scroll position changes before the key position reaches the reference, the before-effect animation of the attribute is applied to the element. As the scroll position changes after the key position reaches the reference, the after-effect animation of the attribute is applied to the element. If multiple key positions are associated with an object, a range of scroll positions are defined by the multiple key positions. The range of scroll positions is between the scroll position when one key position is at the reference and the scroll position when another key position is at the reference. In end use, when the scroll is in the range of scroll positions defined by multiple key positions, the during-effect animation is applied to the element. In the development environment, such before-effect animation, during-effect animation, and after-effect animation may be created and edited by a designer of the animation. The animation chosen for the before-effect, during-effect, and after-effect may be any type of animation that may be performed on the element selected, including but not limited to movement in 2D or 3D, playback, fading, scaling, color, audio, and others. The before-effect animation, during-effect animation, and after-effect animation may differ from one another in type, parameters, etc., or be the same as one another.

Creating and editing animations can also involve multiple elements. Synchronized animation may be desired when more than one element is to be animated. A development environment can facilitate creation of synchronized animation by displaying indicators of key positions of multiple elements so that the relationship to scroll position can be seen. For example, a user selects an element such as a ball on a canvas and initiates a command to set a key position for the ball and define scroll-triggered animation. The key position may be set with reference to any edge of the canvas. The scroll-triggered animation may be defined by before-effect animation and after-effect animation. As described above, before-effect animation and after-effect animation are defined with reference to the key position. The user can then select another element on the same canvas, such as a bat, and initiate a command to set a key position for the bat along with defining scroll-triggered animation for the bat. The scroll-triggered animation for the bat may be defined by before-effect animation and after-effect animation. Note that before-effect animation of the bat and the ball may be different. Likewise the after-effect animation of the bat and the ball may also be different. For example, in the development environment, the animator may place the ball and bat at a location on the canvas where the bat is touching the ball as if the bat appears to be hitting the ball. After placing the ball and bat on the canvas, bat hitting ball, their respective key positions are synchronized, i.e., set at the same scroll position. For example, the key position of both may be set to be 200 pixels from the top edge of the canvas, i.e., the top edge of the document being created. When the scroll in end us reaches the 200 pixel position, the ball and bat will have location attributes corresponding to their location as shown in the development environment, i.e., in which the ball appears to be contacting the ball. Since the respective key positions of both the ball and bat can be visually set on the same canvas, the positions of each of the bat and ball (when the scroll is at the key position) can be set with relation to each other, such that the bat appears to be hitting the ball. The animation will be synchronized such that in the end use environment, during scroll, when the key positions intersect the top edge of the page, the bat will hit the ball. The creation of this synchronized animation may be accomplished visually and interactively without the need for the animator to calculate or code any positions or movement of any of the elements.

The exemplary methods and systems can be applied to any graphical element on a canvas, including but not limited to lines, shapes, figures, images, photographs, containers, video widgets, audio widgets, or any other elements that may be animated. The animation applied to a widget may be any animation supported by the widget including, but not limited to, movement, playback, pause, scaling, color change, etc.

The use of an animation creation environment according to one embodiment facilitates the creation of scroll-triggered animation. For example, features such as the display of indicators for the key position and providing input menus and dialog box inputs facilitate interactively defining scroll-triggered animation. Such features may allow a user to visualize the animation that is being created or edited. Scroll-triggered animations may be created with little or no coding.

These illustrative examples are given to introduce the reader to the general subject matter discussed here and are not intended to limit the scope of the disclosed concepts. The following sections describe various additional embodiments and examples with reference to the drawings in which like numerals indicate like elements.

FIG. 1 depicts an exemplary environment in which techniques for facilitating the visual creation of scroll-triggered animation may be utilized. The methods and systems disclosed herein are also applicable on other computing systems and environments.

The environment shown in FIG. 1 comprises a device 10. The exemplary device 10 is respectively used as a special purpose computing device to provide specific functionality offered by its application 13. As is known to one of skill in the art, such an application 13 may be resident in any suitable computer-readable medium and execute on any suitable processor. For example, as shown, the device 10 comprises a computer-readable medium such as a memory 12 coupled to a processor 11 that executes computer-executable program instructions and/or accesses information stored in memory 12. Such a processor may comprise a microprocessor, an ASIC, a state machine, or other processor, and can be any of a number of computer processors. Such a processor may comprise, or may be in communication with a computer-readable medium which stores instructions that, when executed by the processor, cause the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

A device may also comprise functionality, such as I/O features 17 for connecting to a number of external or internal devices such as a mouse, a CD-ROM, DVD, a keyboard, a display, audio speakers, or other input or output devices. As examples, device 10 is shown with a display 18 and various user interface devices 19. A bus, such as bus 16, will typically be included in the device as well. Devices 10 may be connected to a network (not shown).

The memory 12 comprises a development application 13 that is executed by processor 11 to provide a development environment in which content comprising scroll-triggered animation can be created and edited. In this example, the development application is used to create a content file 15 that comprises the scroll-triggered animation. The memory 12 further comprises an end-use application 14, when executed by the processor, displays content file 15 and/or other content items in an end use environment. For example, end-use application 14 may be a web browser executed to provide render content file 15 in an embodiment in which content file 15 is in the form of a web page document. Content file 15 may be self-executing content that does not require an end-use application 14 for use.

In one exemplary embodiment, visually creating scroll-triggered animation is controlled interactively by the user on the canvas, for example, moving elements by dragging them on the canvas. The canvas may be displayed on display 18 and interfaced through the use of a UI device 19. The canvas provides a medium for visually designing the scroll animation of elements.

Figure 2B:
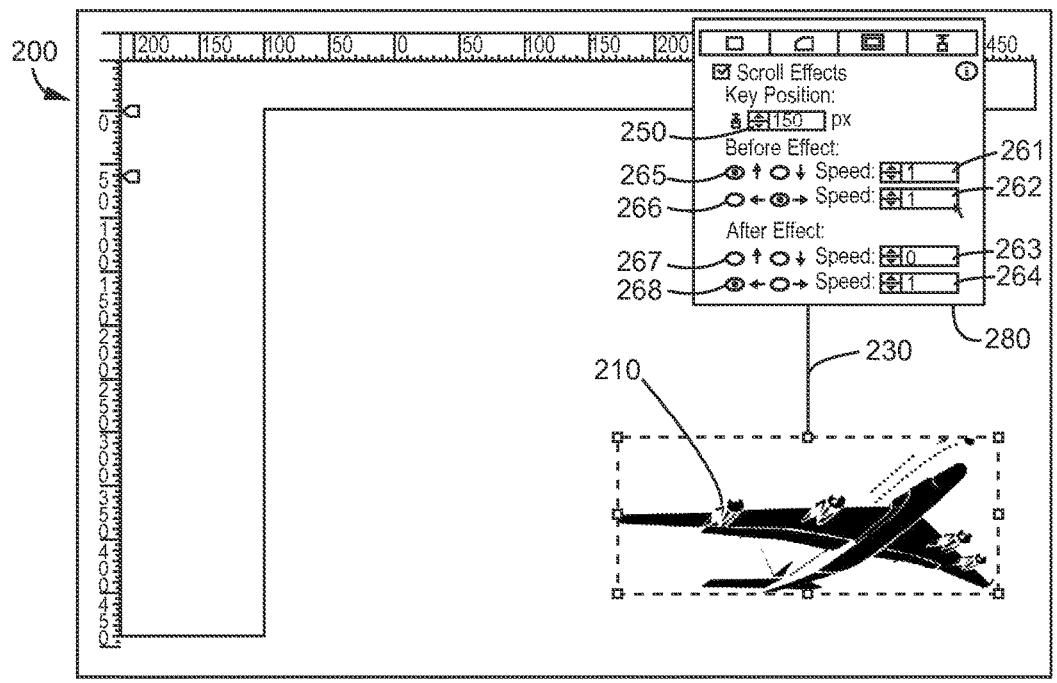

FIGS. 2A and 2B illustrate canvas 200 upon which the scroll animation of element 210 is created. Canvas 200 may be a WYSIWYG canvas. In this example, element 210 is a graphic of an airplane. But element 210 may also comprise an audio widget, a video widget, a slide show, or any other element that may be presented graphically. Once element 210 is selected, as shown by dotted square 211, the user may initiate a command to create a key position and before and after effects for element 210 and to define a scroll-triggered animation. The key position is particular scroll position in the end use environment. An example end use for a web page document is the page rendered and displayed by a browser. In such an end use environment, the scroll-triggered animation is displayed as the page scrolls. When the scroll reaches the specified key position (i.e., the key position at the edge of the browser), the element associated with that key position will have a particular attribute value. In the end use environment, the before-effect is displayed as the page is scrolled and before the key position intersects the edge of the browser's display area. The after-effect is displayed as the page is scrolled after the key position intersects the edge of the browser's display area.

To create such an animation, in the development environment shown in FIG. 2A, the key position is set by handle 240 and distance indicator 230 attached to element 210 at point 212. The key position may be set with reference to the top edge 260 of the document's content. In other embodiments, the key position may be set with reference to any edge or other reference point associated with the display of the document. The handle 240 may be dragged vertically or horizontally on the canvas 200. In this example, as the handle 240 is moved vertically, the length of distance indicator 230 is extended or shortened. In this example, the key position denoted by handle 240 is set at 100 pixels from the top edge 260 as shown by 251.

The attributes for the scroll-triggered animation associated with an element may be entered through the use of a dialogue box 280 such as is shown in FIG. 2B. The dialogue box 280 in FIG. 2B allows a user to enter attributes for animating movement of an element. This dialogue box 280 has an entry item for the key position at 250. When the key position is set as described above, by the user dragging the handle 240, key position entry box 250 is filled in with the pixel location set for the key position. In this example, the key position was set by default to 100 pixels, hence the dialogue box 250 automatically fills in with the number 100. The user may change the key position by clicking on the up arrow or down arrow at 250 using a mouse. The up arrow increases the key position by one pixel for each click of the arrow. Likewise, the down arrow decreases the key position by one pixel for each click of the down arrow. If the user chooses to enter the key position directly at entry item 250 or by the use of the up or down arrows at 250, the key position handle 240 automatically move on the canvas corresponding to the key position the user specifies at 250. For example, in FIG. 2B, the user dragged the handle 240 down 50 pixels and positioned it at 150 pixels. Thus 150 is entered in entry item 250. If the user instead uses the handle 240 to position the key position to 150 pixels, then the key position entry item 250 would be filled in to display 150 pixels. In one example, the default key position is set to 100 pixels when the user selects a command to create a key position. Then the user entered the value "150" at entry item 250. Hence the original key position of 100 is changed to 150 and the handle 240 would move vertically down 50 more pixels to be set 150 pixels from the top edge 260.

In addition, dialogue box 280 also contains entry items for defining the attributes defining the movement of a before-effect and an after-effect. In this example, these effects are simple movements. Other types of effects could additionally or alternatively be specified through such an interface. In this example, one or both of movement in the horizontal and vertical direction can be specified for a before-effect. The before-effect vertical direction may be set by the user clicking to select up-arrow or down-arrow at 265. The up-arrow or down-arrow entry items toggle on and off. When on, a dark circle is displayed, the user is selecting that direction to be applied to the element. Likewise, the horizontal direction may be set by the user clicking to select a left-arrow or a right-arrow at 266. The speed to be applied to the direction of movement is entered in dialogue boxes 261 for the vertical direction and at 262 for the horizontal direction. The speed may be set by entering a number designating the speed desired or by clicking the up arrow or the down arrow or by direct entry of a numerical value provided at 261 and 262.

The movement defined for the after-effect is entered like the movement for the before-effect. The user uses the toggle up-arrow and down-arrow at 267 and 268 to designate a vertical direction and a horizontal direction. Speed for the vertical and horizontal directions is entered at 263 and 264 by selecting a speed or by adjusting the speed using the arrow keys provided at 263 or 264 or through direct entry of a numerical value.

In FIG. 2B, the key position of element 210 is set to be 150 pixels as shown at 212. The scroll-triggered animation for element 210 is defined by the before-effect and after-effect. These are set with reference to the key position 240. In this example, attributes for movement are defined for the before-effect to be up at 265 and to the right at 266. The speed for movement in both these directions is set to 1 at 261 and 262. In this example, the before-effect movement is diagonally up to the right at speed of 1. The attributes for movement for the after-effect are set to be no horizontal movement at 267 and vertical movement to the left at 268. The speed for the movement in vertical is 0 set at 263 and 1 set at 264.

When the user has finished creating the animation desired on the canvas, the content is provided for end use. For example, the content may be saved as one or more files that can be rendered by a browser and page 300 is produced in an end use environment. When the page is displayed, the scroll-triggered animation is displayed as the page scrolls. Thus, as the page is scrolled, the before-effect and after-effect of element 210 are displayed. As the page scrolls, the key position is triggered when the key position intersects the reference such as the top edge of the browser. The before-effect is the animation of element 210 before key position intersects the top edge of the browser as the page is scrolled. The after-effect is the animation of element 210 after key position intersects the top edge of the browser as the page is scrolled.

Figure 3:
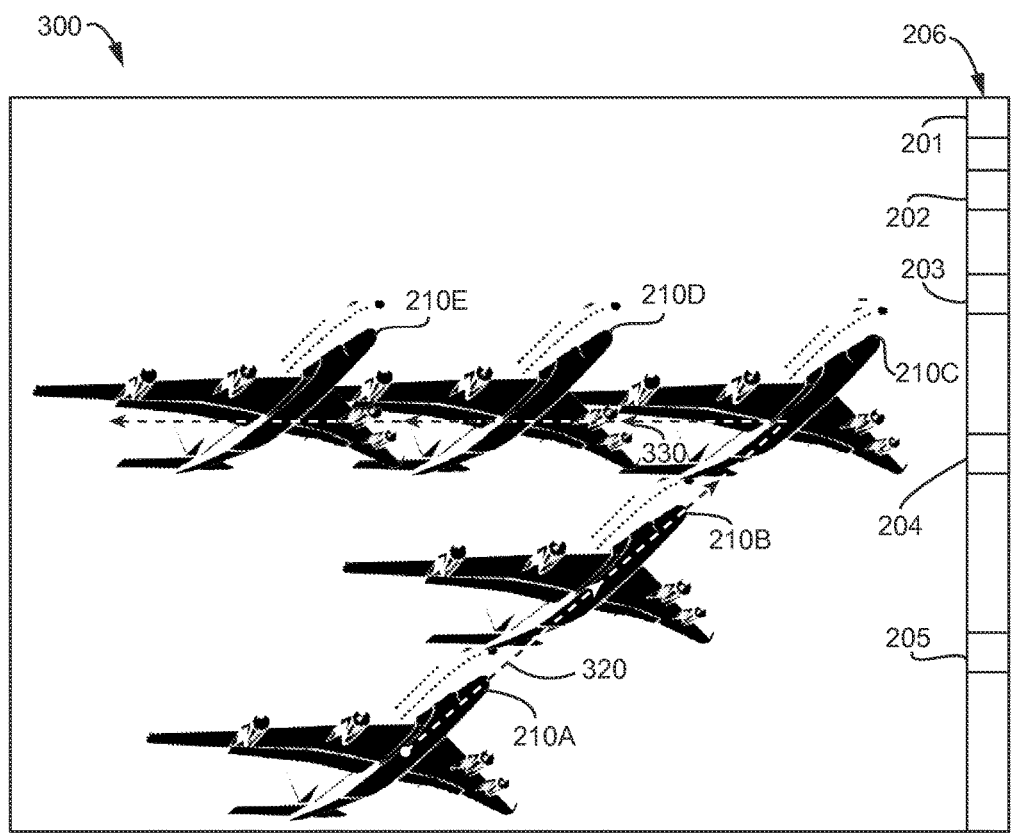
FIG. 3 illustrates an end use environment display displaying an animation defined in the development environment of FIGS. 2A and 2B.

FIG. 3 illustrates an end use environment displaying scroll-triggered animation defined in the development environment of FIGS. 2A and 2B. The scrolling of page 300 occurs as the scroll bar 206 is moved down causing page 300 to move up. As, the page moves up and before the key position 240 intersects the reference, the top edge of browser, element 210 displays the attributes of the before-effect (moving diagonally up and right). After the key position 240 intersects the reference, element 210 displays the attributes of the after-effect (moving to the left). At the start of the scroll-triggered animation in the end use environment, the scroll position 201 is at the top of the scroll bar 206. At this top scroll position 201, element 210 is at position 210A. As the scroll position moves down to 202, element 210 moves up to position 210B. As the scroll position keeps moving down to 203, element 210 is at position 210C. When element 210 reaches position 210C, key position 240 intersects the reference (i.e., top edge of browser 300) and element 210 has the location attribute placing it at 210C. As the scroll continues past 203, the after-effects (movement to the left) attributes are displayed. In this example, when the scroll is at position 204, element 210 is at 210D. Continuing the scroll to position 205 moves element 210 to 210E.

As shown in FIG. 3, the before-effect of element 210 is an up and to the right movement as shown by 210A, 210B, and 210C and arrow 320. When the key position denoted in FIG. 3 by handle 240 and distance indicator 230 intersects the top edge of the browser 300, element 210 is as shown at 210C with key position location 212. After the key position (not shown) intersected the top edge of the browser and element 210 is at key position 212, the after-effect animation will be displayed. In this example, the after-effect of element 210 is movement to the left as shown by 210D and 210E and arrow 330.

Similarly to creating the before-effect and after-effect animation, the during-effect animation may be created. If multiple key positions are associated with an object, a range of scroll positions is defined. The range of scroll positions is defined between the scroll position when one key position intersects a reference point and the scroll position when another key position intersects a reference point. For example, in FIG. 2B, one key position associated with element 210 is defined at 150 pixels with reference point the top edge of the canvas. A second key position may be defined associated with element 210 that is positioned at 250 pixels with reference point the top edge of the canvas. The range of scroll positions is therefore between 210 pixels and 250 pixels from the top edge. Attributes may be defined on the canvas through the use of a dialogue box or by any other means for during-effect animation. During-effect animation is displayed in the end use environment during a scroll when the scroll position is in the range of scroll positions defined by the multiple key positions (i.e., between 150-250 pixels). Hence, in the end use environment if the scroll position is in the range of scroll positions defined by the key positions, element 210 will display the attributes defined for the during-effect animation. Attributes for the during-effect animation may be any animation attributes such as but not limited to movement, sound, color, scaling, etc.

Figure 4C:
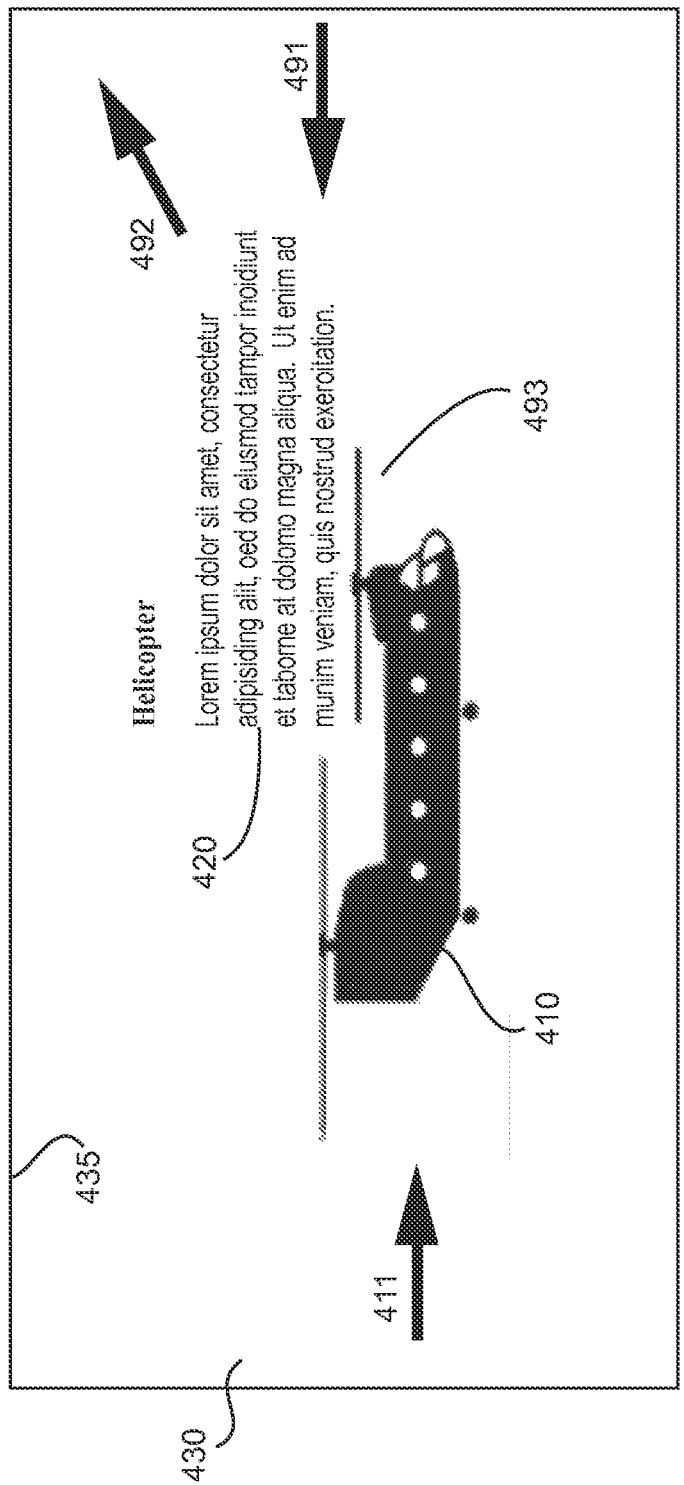
FIG. 4C illustrates an end use environment display displaying an animation of the two design elements of FIGS. 4A and 4B.

The animation of multiple elements may also be created as shown in FIGS. 4A, 4B and 4C. FIGS. 4A and 4B illustrate a user interface of a development environment in which two design elements and respective associated key positions are displayed. FIG. 4C illustrates an end use environment display displaying an animation of the two design elements of FIGS. 4A and 4B. In these examples, synchronizing the animation of more than one element is desired. FIG. 4A shows element 410, a helicopter on canvas 400. In FIG. 4A, element 410 is selected as shown by the dotted box 411. The creation of a key position is initiated and a key position is determined with handle 440 and distance indicator 430. A guide 441 displayed set to help the user align multiple key positions at the same scroll position. The handle 440 may be dragged to set the key position. In this example, the key position is set to 150 pixels from the top edge. The key position location of element 410 is set as shown by 412. The scroll-triggered animation with the before-effect and after-effect of element 410 are set by entering the direction of the vertical motion at 455 and the horizontal motion at 456. The chosen speed for the vertical motion is entered at 451 and the chosen speed for the horizontal motion is entered at 452. Likewise the after-effect of element 410 is entered by setting the vertical direction at 457 and the horizontal direction at 458. The speed for the vertical motion is entered at 453 and the speed for the horizontal motion is entered at 454. In this example the before-effect is horizontal movement from left to right at speed of 1.

FIG. 4B shows the creation of the animation for element 420 on the same canvas 400 as element 410. In this example, element 420 is selected as shown by box 421. The key position is set by dragging handle 450 and distance indicator 460 to guide 441. This allows the key positions of both elements 410 and 420 to be set with relation to each other. The key position of element 420 is also set to 150 pixels from the top edge of the canvas as shown by 480. Once the key position is set to 150 pixels from the top edge of the canvas, the key position location of element 420 is set as shown by 422. As shown in FIG. 4B, the key positions of element 410 and 420 are set such that the text of element 420 sits on top of the front blade of the helicopter, element 410. Setting the key positions with relation to each other provides synchronization of their location when the key position intersects the top edge of the browser. When a document's content is used in an end use environment and the document is scrolled, when key positions 440 and 450 intersect the top edge of the browser, element 410 and 420 will be at their respective key position locations 412 and 422 with the text sitting on the top of the front blade of the helicopter.

Determining the key positions of element 410 and element 420 with relation to each other also allows the synchronization of animation of these two elements since the before-effect and after-effect of elements 410 and 420 are set with their respective key positions 440 and 450 as a reference. For example, the before-effect and after-effect of elements 410 and 420 may be set on the same canvas. For element 410, the before-effect is movement with attributes for a vertical direction set at 455 and a horizontal direction set at 456. In this example, there is not vertical direction entered at 455 and a horizontal direction to the right is entered at 456. Likewise, for element 420, the before-effect is movement with attributes for the vertical direction entered at 485 and for the horizontal direction at 486. In this example, there is no vertical direction entered at 485 and a horizontal direction to the left entered at 486. The respective speeds for the before-effect are entered for element 410 at 451 and 452 and at 481 and 482 for element 420. The speed is set at 0 at 451 and 481 and at 1 at 452 and 482. Similarly, the after-effect attributes for movement for element 410 are entered at 457 and 458 and for element 420 at 487 and 488. The up-arrow is toggled on at 457 and the right arrow is toggled on at 458 indicating a diagonal movement Northeast. The speed set for both vertical and horizontal direction is set to 1 at 453 and 454. Likewise the up arrow is toggled on at 487 and the right arrow is toggled on at 488 giving element 420 a Northeast direction. The speed for the after-effect movement of element 420 is set to 1 both for vertical direction at 483 and for horizontal direction at 484.

In this example, the synchronized animation of the helicopter, element 410, and the text, element 420 in an end use environment is shown in FIG. 4C. As the page scrolls, before the key positions 440 and 450 intersect with the top edge of the browser, the helicopter, element 410, moves from left to right as shown by arrow 490. The text, element 420, moves from right to left as shown by arrow 491. As the page scrolls, when the respective key positions 440 and 450 intersect the top edge of the browser's content area, elements 410 and 420 are at key position locations 412 and 422, respectively. That is, the text of element 420 will align vertically with the front blade 493 of the helicopter. After the key positions intersect the top edge of the browser, both elements 410 and 420 will move diagonally up and to the right as shown by arrow 492. Synchronized animation was created visually with reference to the key positions.

Animation may involve representations of audio content, visual content, or any other type of content may be represented on a canvas by a representation. For example, to create animation of a video widget, a designer may place the desired widgets on the canvas. Scroll-triggered animation can then be enabled for the widget, for example, using an indicator of an associated key position. A before-effect and an after-effect may be defined for the widget in the same or similar manner as such effects are defined for other graphical elements. The before-effect and after-effect may be any action that controls the widget such as, for example, play or pause. In addition, movement of the widget on the screen, as described in the other embodiments above, may also be selected as a before-effect or an after-effect. As an example, the before-effect for an audio widget may be movement on the screen and the after-effect may be start playback. Therefore, before the key position is triggered, the widget would move on the scrolling page. After the key position is triggered, the widget would be at the key position location and playback of the widget would start.

Figure 5:
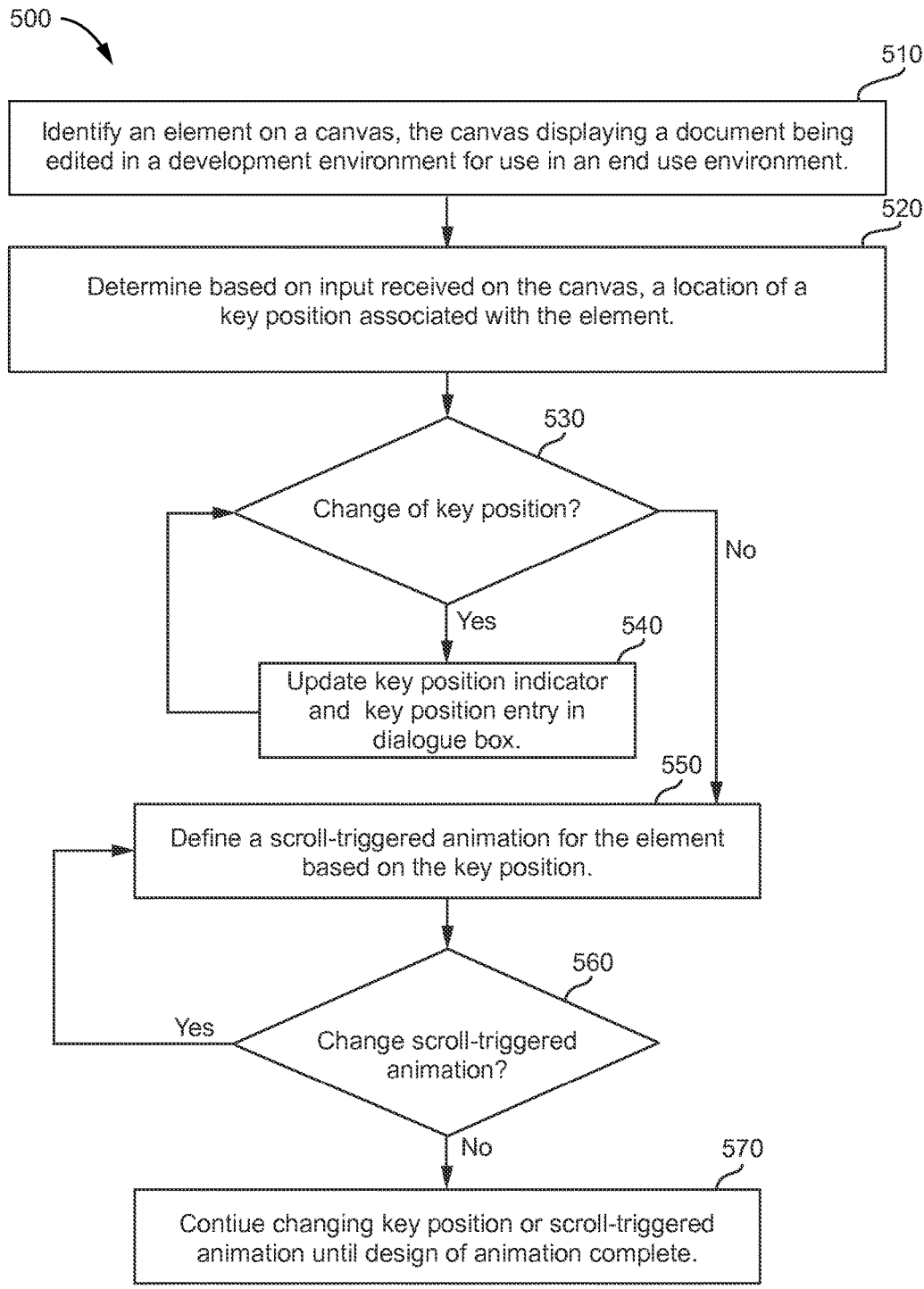
FIG. 5 is a flow chart of an exemplary method of visually creating scroll-triggered animation.

FIG. 5 is a flow chart of an exemplary method 500 for visually creating scroll-triggered animation. Such a method 500 could be performed by the development application 13 of FIG. 1 or by any other suitably configured system.

The exemplary method 500 comprises identifying an element on a canvas, the canvas displaying a document being edited in a development environment for use in an end use environment as shown in block 510. An embodiment of this invention provides a development environment on a device that allows visual creation of animation based on input selecting elements to be animated on a displayed canvas on the device. Such interface may be provided by application 13 on device 10 of FIG. 1. The development environment may include a WYSIWYG canvas displaying a document being edited. The document may comprise elements defining the scroll-triggered animation for the elements. The end use environment is created, for example, as the document displayed on the canvas is rendered by a browser and displayed as a page.

The exemplary method 500 further comprises determining based on input received on the canvas, a location of a key position associated with the element, as shown in block 520. In an exemplary embodiment, a default key position is displayed on the canvas when an element is selected. A default key position may be displayed by indicators such as a handle and a distance indicator associated with the element selected. Alternatively, a key position may be set through the use of a menu or a dialogue box where the user can enter a numerical value for the key position. In this example, if the key position is changed via numerical input, then the indicators of the key position would reflect the numerical value entered by the user. That is, the key position indicator would move to the location on the canvas corresponding to the numerical value entered for the key position.

A user may change the key position of an element as shown in block 530. Change of the key position may be accomplished by dragging the handle indicator to the desired location. Alternatively, change of the key position may also be accomplished by receiving a numerical value for the key position. The use of a menu or dialogue box may facilitate the receipt of a numerical value for the key position. If there is a change in the key position as shown in block 530, the change will be reflected by the key position indicators and any numerical value displayed on the development environment indicating the key position as shown in block 540. For example, if the user drags the key position indicator to a new position, then the numerical value would reflect the new position where the indicator was placed. Alternatively, if the user enters a numerical value for the key position, then the key position indicator would move to the location denoted by the numerical value entered.

The exemplary method 500 further comprises defining a scroll-triggered animation for the element based on the key position as shown in block 550. These attributes may be entered by the user through a dialogue box. Attributes defined for the scroll-triggered animation in the development environment may be displayed on a dialogue box or menu or any other display area in the development environment. In an exemplary embodiment, the scroll-triggered animation may be defined and changed as needed as shown in blocks 550 and 560. In addition, because of the interaction possible in the development environment, the key position or the scroll-triggered animation may be continually changed or updated until the design of the scroll-triggered animation is complete, as shown in box 570. In this example, scroll-triggered animation comprises a before-effect and an after-effect. Attributes associated with the before-effect may be designated by the animator through the use of a menu or a dialogue box. In the end use environment, the before-effect attributes are applied to the element selected before the key position reaches a target (i.e., such as an edge) as the page is scrolled. The after-effect is applied to the element after the key position reaches the target as the page is scrolled. In an exemplary embodiment, the before-effect and after-effect are defined through an interface that allows the user to set and change attributes to apply to the element selected. Such interface may be a dialogue box allowing a user to enter attributes for movement such as direction and speed. The scroll-triggered animation, though, may define any type of animation, not just movement, including but not limited to animation involving movement, color, size, scaling, playback, etc.

Figure 6:
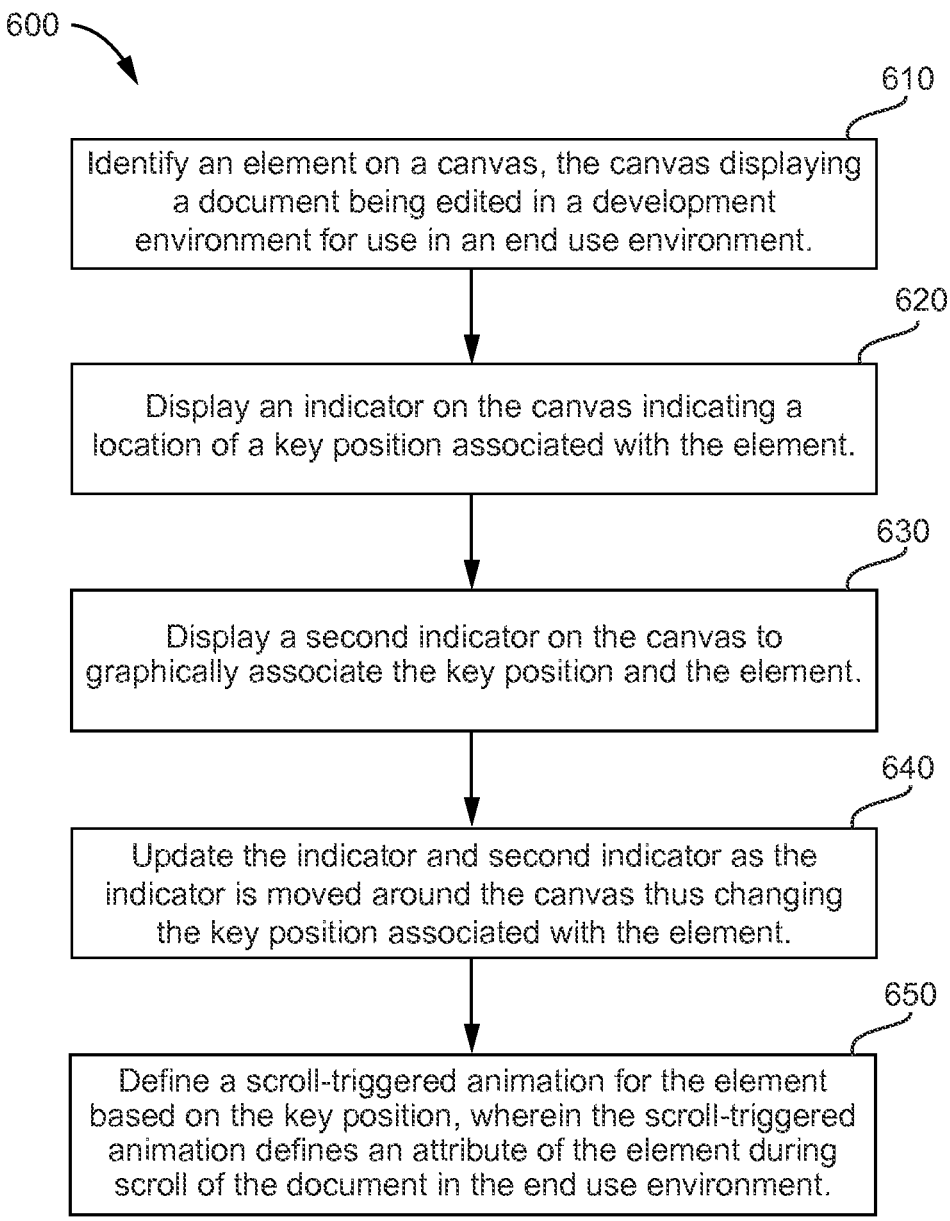
FIG. 6 is a flow chart of an exemplary method of visually creating scroll-triggered animation using one or more key position indicators.

FIG. 6 is a flow chart of an exemplary method 600 for displaying a key position indicator on a canvas. Such a method 600 could be performed by the development application 13 of FIG. 1 or by any other suitably configured system.

In this exemplary embodiment, an element is identified on a canvas. The canvas displaying a document being edited in a development environment for use in an end use environment as shown in block 610. After an element is identified, the element is assigned a default key position and an indicator is displayed on the canvas indicating the location of the default key position associated with the element as shown in block 620. In an exemplary embodiment, the indicator may be a handle associated with the element that may be dragged and moved by the user to any location on the canvas. A second indicator may be displayed on the canvas to graphically associate the key position and the element. This second indicator may graphically display the distance between the key position and the element as shown in block 630. As an example, the second indicator may be a distance indicator in the shape of a line or rod connecting the indicator to the element identified.

The exemplary method 600 further comprises updating the indicator and second indicator as the indicator is moved on the canvas thus changing the location of the key position associated with the element as shown in block 640. As the key position indicator is moved in the development environment, the second indicator stretches or shortens depending on where the key position is desired by the user.

This exemplary method described in FIG. 6, further comprises, defining scroll-triggered animation, wherein the scroll-triggered animation defines an attribute of the element during scroll of the document in the end use environment as shown in block 650.

Figure 7:
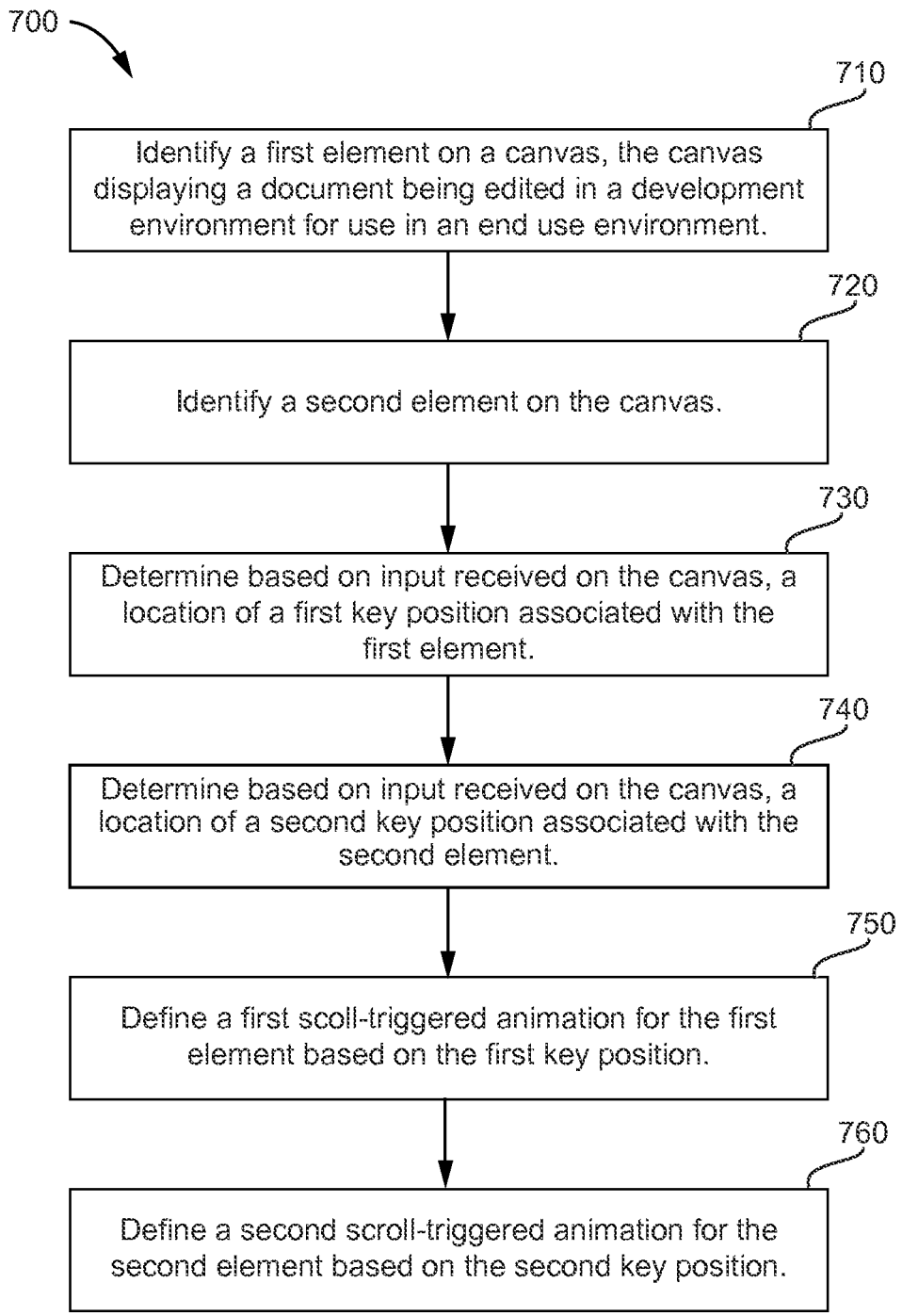
FIG. 7 is a flow chart of an exemplary method of visually creating scroll-triggered animation for multiple elements.

Another exemplary method 700 is described in FIG. 7 in which scroll-triggered animation of two elements is synchronized. Such a method 700 could be performed by the development application 13 of FIG. 1 or by any other suitably configured system.

In this exemplary method, a first element is identified on a canvas, the canvas displaying a document being edited in a development environment for use in an end use environment at block 710. A second element on the same canvas as element 1 is identified in block 720. Determining based on input received on the canvas, a location of a first key position associated with the first element at block 730. Determining based on input received on the canvas, a location of a second key position associated with the second element. The first key position and the second key position determined with relation to each other at block 740. The relationship between the first key position and second key position relative to scroll position can be observed on the canvas. For example, the user may be able to see that both are 100 pixels from the top of the document and thus are synchronized with key positions associated with the same scroll position.

The exemplary method 700 further comprises defining scroll-triggered animation for the first element based on the first key position at block 750. In addition, at block 760, a second scroll-triggered animation is defined for the second element based on the second key position. Since the development environment allows for any number of elements to be placed on the canvas, and in this example, both elements are placed on the same canvas, the positioning of any key position may be set with relation to any other element or key position. This feature of the development environment allows synchronization of scroll-triggered animation between elements. In addition, the synchronization of scroll-triggered animation is done visually and interactively. This reduces or eliminates the need for the animator to calculate positioning, movement, or any other animation attribute that is needed to synchronize animation of the elements. Therefore, the first scroll-triggered animation and the second scroll-triggered animation are synchronized by relation of the first key position and the second key position.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied, for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform addition tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering include herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modification, variations and/or additions to the present subject matter as would be readily apparent to one of ordinary skill in the art.

That which is claimed:

1. A computer implemented method for creating a scroll-triggered animation within a development environment, the method comprising:

identifying a first element to be animated on a canvas, the canvas displaying a document being edited in the development environment for use in an end use environment, wherein the first element is at a position relative to a second element from the document and displayed on the canvas; and defining, via a processor, the scroll-triggered animation to move the first element within the document in response to scrolling the document in the end use environment, wherein defining the scroll-triggered animation comprises:

displaying an adjustable indicator on the canvas that identifies a location in the document of a key position for the scroll-triggered animation;

receiving, via the indicator displayed on the canvas, a first input updating the location in the document of the key position, wherein the key position is adjustable separately from the first element;

receiving, via the canvas, a second input specifying a plurality of animation attributes relative to the key position, wherein the second input specifies (i) a before-effect defined by a first one of the animation attributes applied to the first element before the scroll is at the key position in the end use environment and (ii) an after-effect defined by a second one of the animation attributes applied to the first element after the scroll is at the key position in the end use environment, wherein the location in the document of the key position specifies where, in the scrolling of the document, the specified animation attributes will apply to a movement of the first element relative to the second element; and automatically creating, via the processor, the scroll-triggered animation for the first element based on the first and second inputs received for the key position and the animation attributes, wherein the scroll-triggered animation comprises the before-effect and the after-effect.

2. The method of claim 1 further comprising changing the location of the key position based on receiving additional input on the canvas.

3. The method of claim 1 wherein the scroll-triggered animation is movement of the first element synchronized such that a position of the first element during the scroll-triggered animation corresponds to a scroll position of the document in the end use environment.

4. The method of claim 1 further comprising:
based on receiving additional input moving the indicator on the canvas to a new location, changing the location of the key position to the new location.

5. The method of claim 1 wherein the scroll reaches the key position in the end use environment when the key position is at a predetermined edge of the document.

6. The method of claim 1 wherein the first input received on the canvas for the location of the key position associated with the first element is a numerical value on a dialogue box displayed on the canvas.

7. The method of claim 1 wherein the scroll-triggered animation is movement defined by a plurality of animation attributes, including the animation attribute, specifying direction and speed, the direction and speed received as the second input through a dialogue box on the canvas.

8. The method of claim 1, further comprising a second indicator on the canvas, the second indicator graphically displaying a distance between the key position and the first element.

9. The method of claim 1 wherein the animation attributes defining the before-effect that are applied to the first element comprise direction and speed.

10. The method of claim 1 further comprising a second indicator on the canvas, the second indicator receiving the second input.

11. The method of claim 1, wherein the scroll-triggered animation comprises moving, sizing, coloring, or scaling of the first element.

12. A computer-implemented method for creating a scroll-triggered animation within a development environment, the method comprising:
identifying a first element to be animated on a canvas, the canvas displaying a document being edited in the development environment for use in an end use environment, wherein the first element is at a position relative to a second element from the document and displayed on the canvas; and
defining, via a processor, the scroll-triggered animation to move the first element within the document in response to scrolling the document in the end use environment, wherein defining the scroll-triggered animation comprises:
displaying an adjustable indicator on the canvas that identifies a location in the document of a key position for the scroll-triggered animation;
receiving, via an indicator displayed on the canvas, a first input of a numerical value on a dialogue box displayed on the canvas that updates the location in the document of the key position, wherein the key position is adjustable separately from the first element;
receiving, via the canvas, a second input specifying a plurality of animation attributes relative to the key position,
wherein the second input specifies (i) a before-effect defined by a first one of the animation attributes applied to the first element before the scroll is at the key position in the end use environment and (ii) an after-effect defined by a second one of the animation attributes applied to the first element after the scroll is at the key position in the end use environment,
wherein the location in the document of the key position specifies relative to where, in the scrolling of the document, the specified animation attributes will apply to a movement of the first element relative to the second element; and
automatically creating, via the processor, the scroll-triggered animation for the first element based on the first and second inputs received for the key position and the animation attribute, wherein the scroll-triggered animation comprises the before-effect and the after-effect.

13. The method of claim 12 further comprising a second indicator on the canvas, the second indicator receiving the second input.

14. The method of claim 12 further comprising a second indicator on the canvas, the second indicator graphically displaying a distance between the key position and the first element.

15. A non-transitory computer-readable medium on which is encoded program code for creating a scroll-triggered animation within a development environment, the program code comprising:
program code for identifying a first element to be animated on a canvas, the canvas displaying a document being edited in the development environment for use in an end use environment; and
program code for defining, via a processor, the scroll-triggered animation to move the first element within the document in response to scrolling the document in the end use environment, wherein the first element is at a position relative to a second element from the document and displayed on the canvas, wherein defining the scroll-triggered animation comprises:
program code for displaying an adjustable indicator on the canvas that identifies a location in the document of a key position for the scroll-triggered animation;
program code for receiving, via the indicator displayed on the canvas, a first input updating the location in the document of the key position, wherein the key position is adjustable separately from the first element;
program code for receiving, via the canvas, a second input specifying a plurality of animation attributes relative to the key position,
wherein the second input specifies (i) a before-effect defined by a first one of the animation attributes applied to the first element before the scroll is at the key position in the end use environment and (ii) an after-effect defined by a second one of the animation attributes applied to the first element after the scroll is at the key position in the end use environment,
wherein the location in the document of the key position specifies where, in the scrolling of the document, the specified animation attributes will apply to a movement of the first element relative to the second element; and program code for automatically creating, via the processor, the scroll-triggered animation for the first element based on the first and second inputs received for the key position and the animation attribute, wherein the scroll-triggered animation comprises the before-effect and the after-effect.

16. The non-transitory computer-readable medium of claim 15 wherein the scroll-triggered animation comprises a before-effect and an after-effect, the before-effect defined by a first plurality of animation attributes applied to the first element before the scroll is at the key position in the end use environment, the after-effect defined by a second plurality of animation attributes applied to the first element after the scroll is at the key position.

17. The non-transitory computer-readable medium of claim 16 wherein the first plurality of animation attributes defining the before-effect comprise movement defined by a horizontal direction, a vertical direction, a horizontal speed, and a vertical speed.

18. A non-transitory computer-readable medium of claim 15 wherein the scroll-triggered animation is movement of the first element synchronized such that a position of the first element during the scroll-triggered animation corresponds to a scroll position of the document in the end use environment.

19. A computer implemented method for creating scroll-triggered animations within a development environment, the method comprising:

identifying a first element to be animated and a second element to be animated on a canvas, the canvas displaying a document being edited in the development environment for use in an end use environment, wherein the first element is at a position relative to a third element from the document and displayed on the canvas; and defining, via a processor, a first scroll-triggered animation for the first element and a second scroll-triggered animation for the second element, wherein the scroll-triggered animations move the first element and the second element within the document in response to scrolling the document in the end use environment, wherein defining the scroll-triggered animations comprises:

displaying an adjustable indicator on the canvas that identifies respective locations in the document for a first key position and a second key position for the scroll-triggered animation;

receiving, via the indicator displayed on the canvas, a first input updating the respective locations in the document for the first key position and the second key position, wherein the key positions are adjustable separately from the first element and the second element;

receiving, via the canvas, a second input specifying respective animation attributes relative to the key positions, wherein the second input specifies (i) a before-effect defined by a first one of the animation attributes applied to the first element before the scroll is at the first key position in the end use environment and (ii) an after-effect defined by a second one of the animation attributes applied to the first element after the scroll is at the first key position in the end use environment, wherein the respective locations in the document of the key positions specifies where, in the scrolling of the document, the specified animation attributes will apply to a movement of the first element and the second element relative to the third element;

automatically creating, via the processor, the first scroll-triggered animation for the first element based on the first and second inputs received for the first key position and the respective animation attribute, wherein the first scroll-triggered animation comprises the before-effect and the after-effect; and automatically creating, via the processor, the second scroll-triggered animation for the second element based on the first and second inputs received for the second key position and the respective animation attribute, the first scroll-triggered animation and second scroll-triggered animation synchronized during a scroll of the document in the end use environment by a relation of the first key position and the second key position relative to a scroll position.

20. A computer implemented method for creating a scroll-triggered animation within a development environment, the method comprising:

identifying a first element to be animated on a canvas, the canvas displaying a document being edited in the development environment for use in an end use environment; and defining, via a processor, the scroll-triggered animation to move the first element within the document in response to scrolling the document in the end use environment, wherein defining the scroll-triggered animation comprises:

displaying an adjustable indicator on the canvas that identifies respective locations in the document for a first key position and a second key position for the scroll-triggered animation;

receiving, via the indicator displayed on the canvas, a first input updating the respective locations in the document for the first key position and the second key position that together define a range of locations, wherein the key positions are adjustable separately from the first element;

receiving, via the canvas, a second input specifying animation attributes relative to the key positions, wherein the second input specifies (i) a before-effect defined by a first one of the animation attributes applied to the first element before the scroll is at the first key position in the end use environment and (ii) an after-effect defined by a second one of the animation attributes applied to the first element after the scroll is at the first key position in the end use environment, wherein the range of locations of the key positions specifies where, in the scrolling of the document, the specified animation attributes will apply to a color change to the first element; and automatically creating, via the processor, the scroll-triggered animation for the first element based on the first and second inputs received for the key positions and the animation attributes, wherein the scroll-triggered animation comprises the before-effect and the after-effect.

* * * * *